United States Patent [19]

Egan

[11] Patent Number: 4,944,579
[45] Date of Patent: Jul. 31, 1990

[54] DETECTION SYSTEM FOR CIRCULARLY POLARIZED RADIATION

[75] Inventor: Walter G. Egan, Woodhaven, N.Y.

[73] Assignee: Grumman Aerospace Corporation, Bethpage, N.Y.

[21] Appl. No.: 359,371

[22] Filed: May 31, 1989

[51] Int. Cl.$^5$ .......................... G02B 5/30; G02B 5/28
[52] U.S. Cl. .................................... 350/396; 250/225; 350/166; 350/404
[58] Field of Search ............... 350/164, 165, 166, 396, 350/397, 398, 403, 404; 250/225, 226

[56] References Cited

U.S. PATENT DOCUMENTS

| | | | |
|---|---|---|---|
| 2,309,626 | 2/1943 | Conrad | 350/404 |
| 2,535,781 | 12/1950 | Burchell | 350/404 |
| 3,488,105 | 1/1970 | Snaper | 350/404 |
| 3,897,136 | 7/1975 | Bryngdahl | 350/404 |
| 4,807,981 | 2/1989 | Takizawa et al. | 350/404 |

Primary Examiner—Bruce Y. Arnold
Assistant Examiner—Martin Lerner
Attorney, Agent, or Firm—Scully, Scott, Murphy & Presser

[57] ABSTRACT

A system for detecting and analyzing polarized radiation having a circular polarization component while utilizing radiation filter structures having combined wavelength and polarization sensitive characteristics. The system includes a radiation filter which comprises a plurality of different wavelength $\lambda1$ to $\lambda n$ interference filter coatings applied to a filter substrate as a plurality of parallel adjacent stripes, such that different wavelengths $\lambda1$ to $\lambda n$ are passed by the different stripes. Moreover, a plurality of different polarization filters of either parallel polarization or perpendicular polarization, are also applied as a plurality of parallel adjacent stripes to the different areas of the filter substrate. The arrangement includes first, second, third and fourth interference filter stripes for each wavelength $\lambda1$ to $\lambda n$, two parallel polarization filters for each wavelength $\lambda1$ to $\lambda n$, and two perpendicular polarization filters for each wavelength $\lambda1$ to $\lambda n$. A complete detection and analysis of the polarization characteristics of the circularly polarized radiation is achieved by applying a quarter wave plate to each polarization component (both parallel and perpendicular) of each wavelength $\lambda n$ to provide two measurements, one with and one without the quarter wave plate for each measurement (both parallel and perpendicular) at each wavelength $\lambda n$.

6 Claims, 6 Drawing Sheets

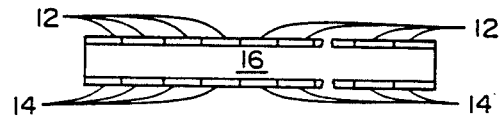
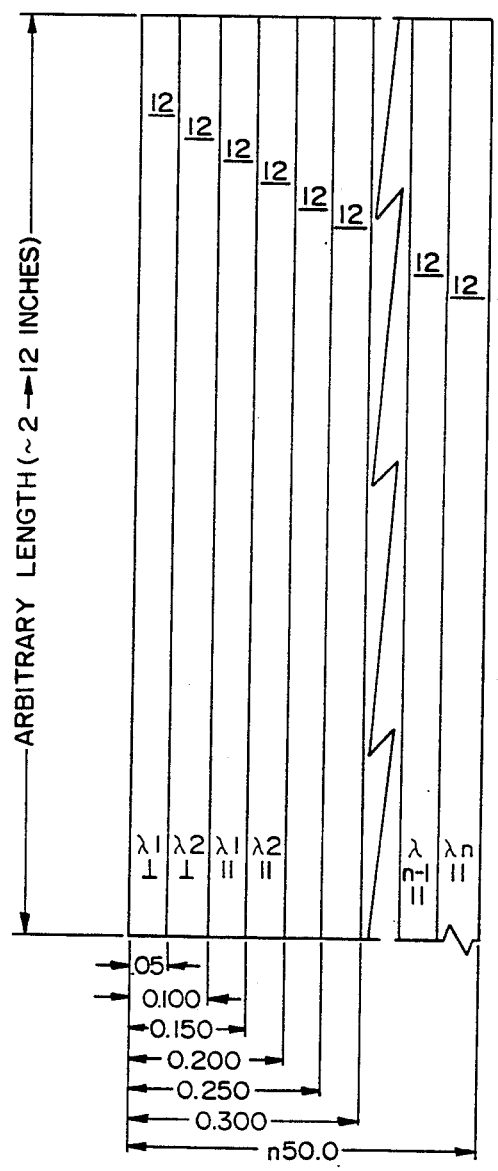

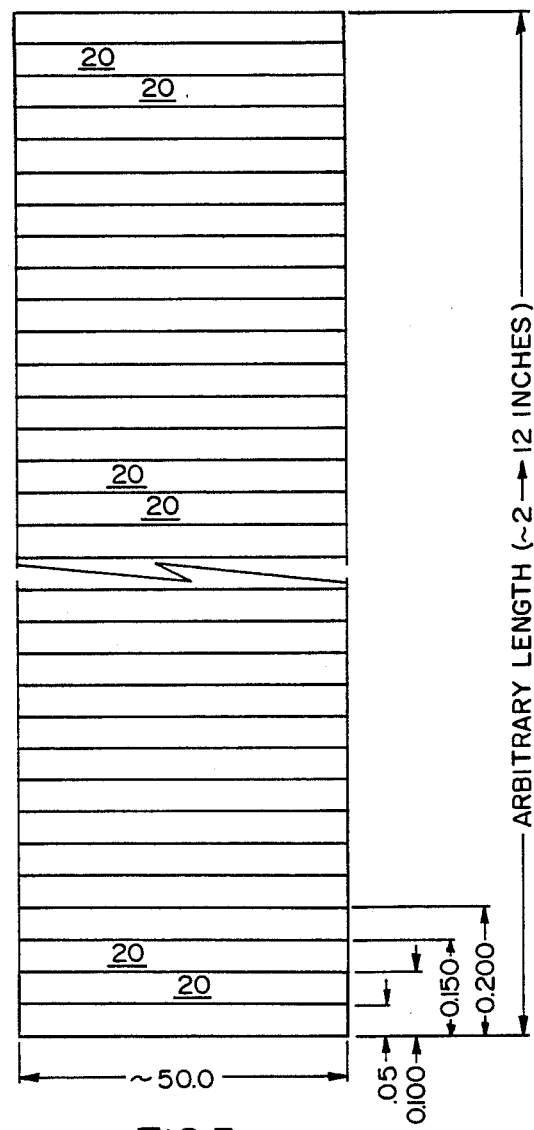

DETECTION SYSTEM FOR CIRCULARLY POLARIZED RADIATION BACKGROUND OF THE INVENTION

1. Field of the Invention

The present invention relates generally to a system for detecting and analyzing polarized radiation, including radiation having a circularly polarized component, while utilizing a radiation filter/detector structure having combined wavelength sensitive and polarization sensitive characteristics, including circularly polarized radiation incident with a skewed polarization plane.

More particularly, the subject invention pertains to a system for detecting polarized radiation having a circularly polarized component while utilizing radiation filter/detector structures fabricated on a single substrate. Different areas of the substrate are coated with different wavelength interference filter coatings, and polarization filters having both parallel and perpendicular polarizing filtering characteristics are applied onto the substrate in association with the different wavelength interference filter coatings The present invention is also pertinent to detecting circularly polarized radiation incident with a skewed polarization plane.

As is well known and recognized in the polarization arts, polarized light can be classified according to the orientation of the electric vector. In linearly polarized light, the electric vector remains in a plane perpendicular to the propagation direction. For monochromatic light, the amplitude of the vector changes sinusoidally with time. In circularly polarized light, the top of the electric vector describes a circular helix about the propagation direction. The amplitude of the vector is constant. The frequency of rotation is equal to the frequency of the light. In elliptically polarized light, the vector also rotates about the propagation direction, but the amplitude of the vector changes so that the projection of the vector on a plane at right angles to the propagation directions describes an ellipse. Elliptical polarization can be the result of summing linearly polarized light and circularly polarized light. These different types of polarized light can all be broken down into two linear components at right angles to each other.

Moreover, polarization measurements are frequently standardized by taking the measurements with the polarization lines of the polarization filters positioned either parallel or perpendicular to a principal plane which is positioned in a special perpendicular position. As is known in the polarization arts, the principal plane is a plane defined by two intersecting lines, with the first line being defined by the direction of the incident radiation onto the surface from which the linearly polarized radiation is being reflected, and the second line being defined by the direction of observation of the linearly polarized radiation reflected from the surface.

A special case exists when the principal plane also contains a third line extending vertically, normal from the surface being observed and detected. In that special case, both directions (parallel $\parallel$ and perpendicular $\perp$) of the interference filter lines can be oriented to be either parallel to or perpendicular to the principal plane, which enables the linear polarization of the light being detected to be fully analyzed as to its polarization characteristics.

However, in many instances, the principal plane will not contain a third line extending vertically, normal from the surface being observed and detected. In those instances, the principal plane is skewed relative to that third normal line, and can be referred to as a skewed principal plane. With a skewed principal plane, a complete analysis and characterization of the polarization of the radiation requires a second filter/detector, with the direction of its lines of polarization (both parallel 11 and perpendicular $\perp$) being positioned at an acute angle, preferably 45° for ease of analysis, relative to the lines of polarization (both parallel $\parallel$ and perpendicular $\perp$) of the first filter/detector. Accordingly, for detecting radiation with a circular polarization component, with a skewed principal plane, the number of $\lambda n$ filters is doubled, and half of the $\lambda n$ filters have a quarter wave plate applied thereto.

The radiation filter structures as described herein are suitable for use with focal plane array radiation detectors The radiation filter structures may be used to produce color (Wavelength) and polarization sensitivity characteristics for recently developed square micro infrared detectors having sizes between 0.001 and 0.004 inches. These new detectors are composed of materials such as indium antimonide, platinum silicide and mercury-cadmiumtelluride, for instance.

There is a need in advanced military infrared systems for wavelength dependent polarization filters which arises because military targets and their backgrounds have different and distinguishable infrared polarization characteristics. Moreover, such military targets and their backgrounds also have polarization properties of both emitted and scattered radiation. Although present military electrooptical systems do not specifically have polarization sensitivity designed into them, recent developments in the mathematical analysis of such optical systems allow polarization sensitive systems to be designed and constructed.

2. Discussion of the Prior Art

Interference optical filters and their manner of construction and characteristics are well known in the optical arts. U.S. Pat. Nos. 3,771,857 and 3,981,568 are of particular interest to the present invention by disclosing technology for producing multifrequency striped interference filters which can be utilized in the present invention. U.S. Pat. No. 3,981,568 in particular discloses a technological method for producing a striped dichroic filter on a substrate. The surface of the substrate supports a first set of spaced parallel stripes capable of transmitting or reflecting a first color and a second set of spaced parallel stripes capable of transmitting or reflecting a second color. The first and second sets of stripes are disposed parallel to each other and in abutting relationship with no space or overlap between adjacent stripes. Third and additional sets of stripes for reflecting other colors may also be provided pursuant to the disclosure of this patent. In the method for making the striped dichroic filter, a dual lift-off procedure is used which utilizes both metal and resist lift-off techniques that are mutually exclusive.

Polarization optical filters and their manner of construction and characteristics are also well known in the optical arts. Polarization can be useful in the detection of specific targets as the polarization properties of particular targets frequently differ from the polarization properties of background radiation. The production of polarized radiation is quite common in nature, and occurs in sky and sunlight reflection and scattering and emission from water and land surfaces, roads and highways, windows, and vehicle bodies, to name a few instances. However, the use of polarization analysis in remote sensing has often been limited to astronomy, where every bit of information available in the optical spectral region must be utilized in analyses.

In order to sense or detect polarization in an electromagnetic wave, an optical element is necessary that responds nonuniformly to the vector directional property of the incident radiation. Such devices are available as polaroids, wire grid polarizers, dichroic polarizers, piles of plates, double refraction prisms, or asymmetrical scatters. The oldest instrument for analyzing polarization is the wire grid which was first used as a polarizer in 1888 to evaluate the properties of the then recently discovered radio waves. By orienting the grid either parallel or perpendicular to the electric vector of the radiation, the electric field is either short circuited or permitted to pass therethrough, respectively.

This same principle was extended into the infrared in 1911 for polarization analyses of radiation from 24 to 314 $\mu$m. One recent application was in 1960 in which wire grids were made by evaporating gold onto a plastic replica of a diffraction grating. Such grids are available commercially from Perkin-Elmer with transmission in the wavelength range from 2.5 $\mu$m to well beyond 333 $\mu$m. The polarization properties of these wire grid polarizers are shown in FIG. 6., which is a plot of the ratio of the transmission of the parallel component of polarization to the perpendicular component as a function of wavelength. The larger the ratio, the better the performance as an analyzer.

In 1938 the chemical analog of the wire grid was invented. Long, thin polymer molecules aligned nearly parallel to each other, with high conductivity produced by free electrons associated with iodine atoms in the molecules, serve to absorb the electric field parallel to the molecules, and the perpendicular component passes through with a small absorption. Pursuant thereto, various sheet polarizers are available from the Polaroid Corporation with usable wavelength ranges covering the region from 375 nm to 2.0 $\mu$m. Minneapolis Honeywell also manufactures ultraviolet polarization analysers.

The polarization filtering techniques described hereinabove are applicable and pertinent to the detection system of the present invention to the extent that they can be utilized to produce a filter structure on a substrate as described in greater detail hereinbelow.

SUMMARY OF THE INVENTION

Accordingly, it is a primary object of the present invention to provide a detection system for detecting polarized radiation having a circular polarization component while utilizing radiation filter/detector structures having combined wavelength sensitive and polarization sensitive characteristics.

A further object of the subject invention is the provision of a detection system for polarized radiation having a circular polarization component and a skewed polarization plane while utilizing radiation filter/detector structures having combined wavelength sensitive and polarization sensitive characteristics fabricated on a single substrate. More specifically, different areas of the substrate are coated with different wavelength interference filter coatings, and polarization filters having both parallel and perpendicular polarized filtering characteristics are applied onto the substrate in association with the different wavelength interference filter coatings thereon. Moreover, the present invention allows polarized radiation, particularly circularly polarized radiation, to be detected and characterized completely as to its polarization properties, even with a skewed polarization plane.

In accordance with the teachings herein, the present invention provides a system for detecting and analyzing polarized radiation having a circular polarization component while utilizing radiation filter/detector structures having combined wavelength and polarization sensitive characteristics constructed on a single filter/detector substrate. The system includes first and second radiation filters, each of which comprises a plurality of different wavelength ($\lambda 1$ to $\lambda n$) interference filter coatings applied to different areas of the filter, such that different wavelengths $\lambda 1$ to $\lambda n$ are passed by the different areas. Moreover, a plurality of different polarization filters, of either parallel polarization or perpendicular polarization, are also applied to the different areas of the filter substrate. The arrangement is such that some of the areas of the filter substrate pass radiation of parallel polarization, and others of the different areas pass radiation of perpendicular polarization. For detecting and characterizing radiation with a circular polarization component, the number of $\lambda n$ filters is doubled, and half of the $\lambda n$ filters (with both parallel $\lambda$ and perpendicular $\perp$ polarization filters associated therewith) have a quarter wave plate applied thereto.

When detecting polarized radiation with a skewed polarization plane, first and second substantially identical filter structures as described hereinabove are utilized. A complete detection and analysis of the polarization characteristics of the radiation is achieved by orienting the first radiation filter with its parallel and perpendicular axes of polarization positioned at acute angles to respectively the parallel and perpendicular axes of polarization of the second filter, such that radiation incident on the first and second radiation filters with a skewed polarization plane can be detected and analyzed with respect to its state of polarization.

In greater particularity, in preferred embodiments, the acute angles are preferably 45° to facilitate easy conversion of the initial polarization measurements to those of a perpendicular polarization plane.

Moreover, in several disclosed embodiments the plurality of different wavelength coatings are applied as a plurality of parallel adjacent coating stripes and includes first, second, third and fourth stripes for each wavelength $\lambda 1$ to $\lambda n$, two parallel polarization filters for each wavelength $\lambda 1$ to $\lambda n$, and two perpendicular polarization filters for each wavelength $\lambda 1$ to $\lambda n$, such that parallel and perpendicular polarization components are passed, and can be detected, for each wavelength $\lambda 1$ to $\lambda n$. Moreover, a quarter wave plate designed for each particular frequency $\lambda n$ is applied to half of the $\lambda n$ filter structures.

In one disclosed embodiment of the filter/detector structures, the plurality of parallel adjacent interference filter coating stripes are applied on a first side of the substrate, and the plurality of different polarization filters are applied to the opposite side of the substrate as stripes in parallel and aligned with the interference filter stripes. In a second disclosed embodiment of the filter/detector structures, the plurality of parallel adjacent interference filter coating stripes and the plurality of different polarization filter stripes are both applied on the same side of the substrate, with the plurality of different polarization filters preferably being applied over the plurality of parallel adjacent interference filter coating stripes, which are applied directly to the surface of the substrate. The quarter wave plate coatings can then be applied as corresponding stripes on either the interference filter stripes or on the polarization filter stripes.

In one advantageous embodiment disclosed herein, the substrate for the filter structure is formed directly by a radiation detector array which preferably comprises a focal plane array radiation detector. In this embodiment, a passivating layer can be applied intermediate between the radiation detector array and the filters or filter coatings, or the quarter wave plate coatings, to prevent any possible damage to the underlying radiation detector array.

In all of the disclosed embodiments, the plurality of different wavelength coating stripes include at least first and second, and possibly third and fourth, stripes for each wavelength $\lambda 1$ to $\lambda n$, and further includes at least one parallel polarization filter for each first stripe for each wavelength $\lambda 1$ to $\lambda n$, and at least one perpendicular polarization filter for each second stripe for each wavelength $\lambda 1$ to $\lambda n$, such that parallel and perpendicular polarization components are passed for each wavelength $\lambda 1$ to $\lambda n$.

BRIEF DESCRIPTION OF THE DRAWINGS

The foregoing objects and advantages of the present invention for a detection system for polarized radiation having a circular polarization component while utilizing filter structures having combined wavelength and polarization sensitive characteristics may be more readily understood by one skilled in the art with reference being had to the following detailed description of several preferred embodiments thereof, taken in conjunction with the accompanying drawings wherein like elements are designated by identical reference numerals throughout the several views, and in which:

FIGS. 1 and 2 are respectively top planar and cross sectional views of a first embodiment of a filter structure in which stripes of an interference filter coating and stripes of polarization filters extend lengthwise along a base substrate;

FIGS. 3 and 4 are respectively top planar and cross sectional views of a second embodiment of a filter structure in which stripes of an interference filter coating and stripes of polarization filters extend widthwise across a base substrate;

DETAILED DESCRIPTION OF THE DRAWINGS

Figure 5:
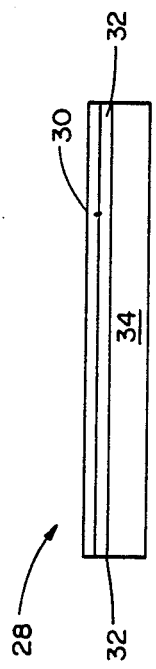
FIG. 5 is a cross sectional view of a third embodiment of a filter structure in which interference filter coating stripes and polarization filter coating stripes are fabricated on the same side of the base substrate.

Referring to the drawings in detail, FIGS. 1 and 2 are respectively top planar and cross sectional views of a first embodiment of a first filter structure in which stripes 12 of an interference filter coating extend lengthwise along a base substrate 16 on one side thereof, and stripes 14 of parallel and perpendicular polarization filters extend in correspondence and parallel therewith on the second opposite side of the substrate. The dimensions given in the drawings are in inches.

The organization of the stripes is such as to pass, from left to right referring to the bottom of FIG. 1, radiation at a first wavelength $\lambda 1$ with a perpendicular polarization component, hereby designated $\lambda 1\perp$, radiation at a second wavelength $\lambda 2$ with a perpendicular polarization component, $\lambda 2\perp$, radiation at a wavelength $\lambda 1$ with a parallel polarization component, hereby designated $\lambda 1 \parallel$, and similarly $\lambda 2 \parallel \ldots$ to $\lambda n-1 \parallel$, $\lambda n \parallel$.

The substrate 16 is chosen of a material suitable to pass the wavelengths of interest, and in infrared embodiments an infrared transmitting substrate such as silicon, germanium or sapphire can be utilized.

The polarizing filters 14 preferably are composed of highly conducting continuous fine lines of metallic material such as gold, silver, copper or nickel or metallic or semiconducting alloys. The function of the fine metallic lines is to short circuit in one direction the electric component of the electromagnetic radiation incident on the filter and thus filter out one of the two polarization components. Thus, in each parallel polarization stripe 14, the fine lines are oriented perpendicular to the fine lines of each perpendicular polarization stripe 14, although the stripes extend in the same direction. The conducting lines may be formed on the substrate by using a photolithographic masking technique, or by ruling grooves on the substrate surface after evaporation of a continuous coating of the metallic line material. The technology to produce the polarizing side of the filter is already in existence. Gold line polarization filters one inch in diameter have been produced with 640 lines per millimeter (16256 lines/inch), thus having a center to center spacing of 0.0615 mil (one mil=0.001 inch). These filters are useful to a wavelength as short as 2.5 $\mu$m, with the longer wavelength limit being determined only by the transmission of the substrate (and to some extent, by the conductivity of the conducting lines).

Figure 6:
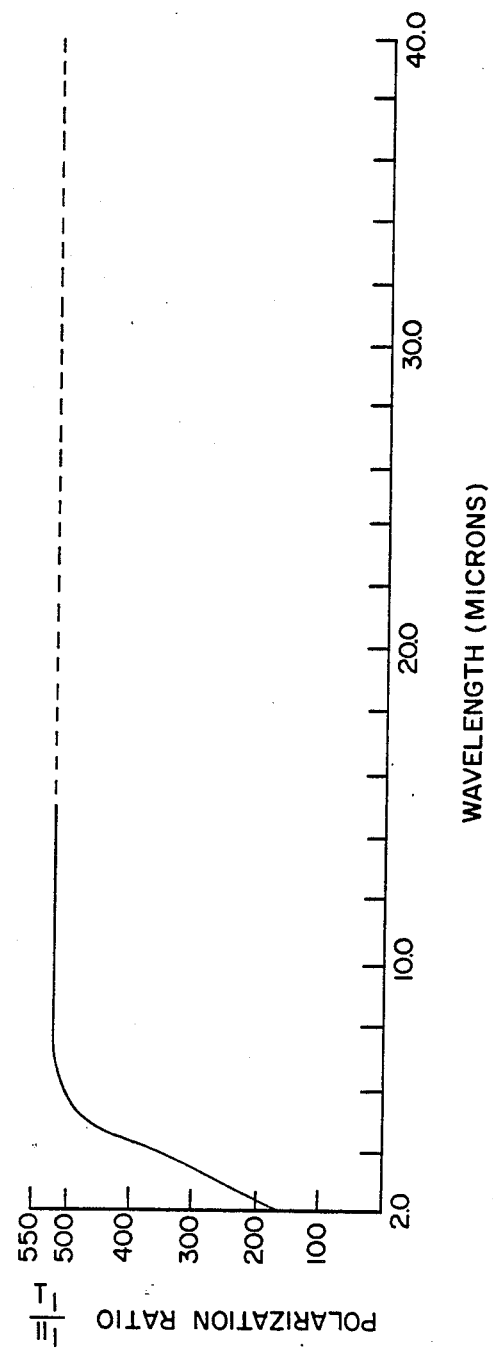
FIG. 6 illustrates the polarization properties of a radiation polarization filter constructed pursuant to the disclosure herein and shows a plot of the ratio of the parallel to perpendicular polarization components passed by the filter as a function of wavelength.

The approximate transmission of a polarization filter of this type is shown in FIG. 6. The polarization ratio is plotted as a function of the wavelength of the incident radiation in units of microns. The polarization ratio ($I_\parallel/I_\perp$) is the ratio of the parallel transmitted component to the perpendicular transmitted component. The curve represents the attenuation of the perpendicular polarized component as a function of wavelength. The attenuation becomes very significant (~250) at a wavelength of 2.5 μm and rises to ~500 at a wavelength of 3.5 μm.

The different wavelength λ1 to λn interference filter coatings 12 applied on the first side of the substrate can be applied pursuant to the dual lift-off procedure described in U.S. Pat. No. 3,981,568 for producing multifrequency striped interference filters. The different wavelength interference coatings could also be prepared by using photolithographic masking techniques. Alternatively, the different wavelength interference coating stripes and the polarization filters could be prepared independently and then cemented together as one unit.

Photolithographic techniques, using either laser microlithography or electron microlithography, as have been developed and used in very large scale integrated (VLSI) circuits, are also suitable to construct embodiments of the present invention, and for the fabrication of either or both of the interference filter stripes and the polarization filter stripes.

FIGS. 3 and 4 are respectively top planar and cross sectional views of a second embodiment of a filter structure in which stripes 20 of an interference filter coating and stripes 22 of the polarization filters extend widthwise across a base substrate 24.

In the embodiments of FIGS. 1-4, the polarizing filters are stripes of the same dimension and extend in the same direction as the interference filter stripes, although some embodiments may utilize different width stripes. In particular applications of the filter structure, they can be used in association with focal plane array sensors which comprise an n×m array of detectors positioned in a focal plane, which will determine the dimensions and requirements of the particular filter structure. Moreover, in some embodiments, the stripes of interference filters might run perpendicular to the stripes (not the lines) of the polarization filters, which might facilitate data processing by outputting the data in a different order of format.

When the interference filter stripes are on one side of the substrate and the polarization filter stripes are on the second side of the substrate, as in the embodiments of FIGS. 1-4, it is possible to have some cross colorization or cross talk between the different channels defined by the stripes across the width of the substrate. Any such possible cross colorization can be minimized by the embodiment of FIG. 5 which is a cross sectional view of a third embodiment 28 in which interference filter coating stripes 30 and polarization filter coating stripes 32 are mounted on the same side of a base substrate 34. Depending upon the particular design requirements and the application, the filter structure 28 might have the interference filter stripes and the polarization filter stripes extend along the length of the substrate, as in FIGS. 1 and 2, or extend across the width of the substrate, as in FIGS. 3 and 4, or possibly extend in perpendicular directions to facilitate the particular requirements of data processing. The embodiment of FIG. 5 can be constructed by fabricating the stripes of interference coating material on the substrate using any of the possible technical approaches described hereinabove, and then fabricating the polarization filter stripes thereover, either directly thereon, or over an intermediate passivating or buffer layer. If the polarization filter stripes are being fabricated by photolithographic techniques and the conductivity of the interference filter stripes does not interfere with operation of the polarization filters, then the latter filters could be fabricated directly on top of the stripes of the interference filters.

FIG. 6 illustrates the polarization properties of a radiation polarization filter constructed pursuant to the disclosure herein, with plots of the ratio of the parallel to perpendicular polarization components passed by the filter as a function of wavelength.

Figure 7:
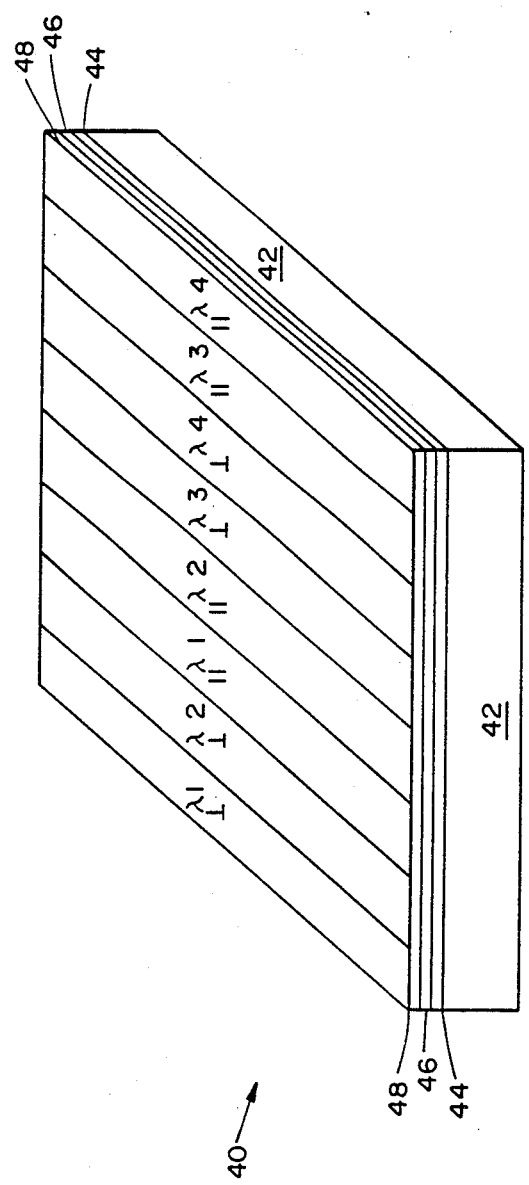
FIG. 7 illustrates a further embodiment of the filter structure in which interference filter coating stripes and polarization filter coating stripes are fabricated directly on the surface of a detector comprising a focal plane array sensor to form one integral filter/detector structure.

FIG. 7 illustrates a further embodiment 40 of a filter structure in which the interference filter coating stripes and the polarization filter coating stripes are fabricated on a substrate 42 formed by a detector array 42 which can be a focal plane array sensor. The surface of the detector array 42 can be protected by a passivating or buffer layer 44, over which the stripes of the polarization filter coatings 46 are applied, over which the interference filter coating stripes 48 are applied, or vice versa.

Figure 9:
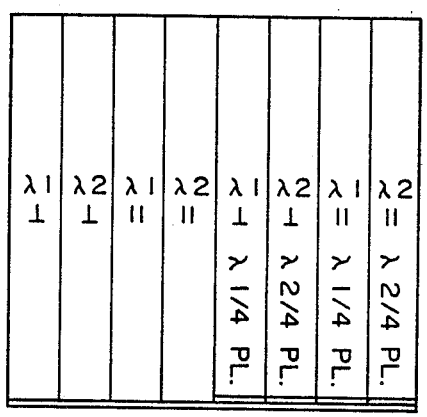
FIG. 9 illustrates an embodiment of a filter structure pursuant to the present invention in which the interference filter coating stripes and polarization filter coating stripes for two wavelengths $\lambda 1$ and $\lambda 2$ includes a quarter wave plate stripe- attached thereto to enable a complete analysis of the circular polarization component of radiation being detected.

FIG. 9 illustrates a first embodiment of the present invention for detecting and analyzing radiation having a circular polarization component in the special case of an orthogonal principal plane, and includes a quarter wave plate added for each parallel and perpendicular polarization filter for each wavelength λn, which results in a doubling of the number of required interference filter/polarization filter stripes, to provide each measurement with an additional measurement with a quarter wave plate added thereto (possible quadrupling with one quarter wave plate at 0° orientation and a second wave plate at 45° orientation).

A radiation filter/detector as discussed hereinabove will operate to detect incident polarized radiation completely and satisfactorily as long as the polarization lines of the radiation filter/detector are oriented parallel and perpendicular to the principal plane of polarization. As is known in the art, the principal plane of polarization (sometimes referred to also as the plane of vision) of polarized radiation is a plane defined by two intersecting lines, with the first line being defined by the direction of the incident radiation onto the surface from which the linearly polarized radiation is reflected, and the second line being defined by the direction of observation of the linearly polarized radiation.

For purposes of explanation, assume that an optical system utilizing a filter/detector structure as described hereinabove is observing an area of the earth illuminated by the sun. The first line is defined by the direction of the incident radiation extending from the sun to the area being observed and detected, and the second line is defined by the line extending from the detecting optical system to the area being observed and detected. The principal plane is defined by the plane containing the first and second lines which intersect at the area being observed and detected.

A special case exists when the principal plane also contains a third line extending vertically (as for emitted thermal infrared radiation), normal from the area of the earth being observed and detected. In that special case, both directions (parallel $\parallel$ and perpendicular $\perp$) of the interference filter lines can be oriented to be either parallel to (and contained by) or perpendicular to the principal plane, which enables the linear polarization of the light being detected to be fully analyzed and characterized as to its polarization properties. For emitted thermal infrared radiation, there is no incident direction as such because the radiation originates within the surface being observed.

However, in the vast majority of instances, the principal plane will not contain the third line extending vertically, normal from the area being observed and detected. In those instances the principal plane will be skewed relative to that third normal line, and can be referred to as a skewed principal plane. With a skewed principal plane, a complete analysis and characterization of the polarization of the linearly polarized radiation requires a second filter/detector with the direction of its lines of polarization (both parallel || and perpendicular ⊥) being positioned at acute angles, preferably 45° for ease of analysis, relative to the lines of polarization (both parallel || and perpendicular ⊥) of the first filter/detector, as illustrated by the embodiment of FIG. 8.

Figure 8:
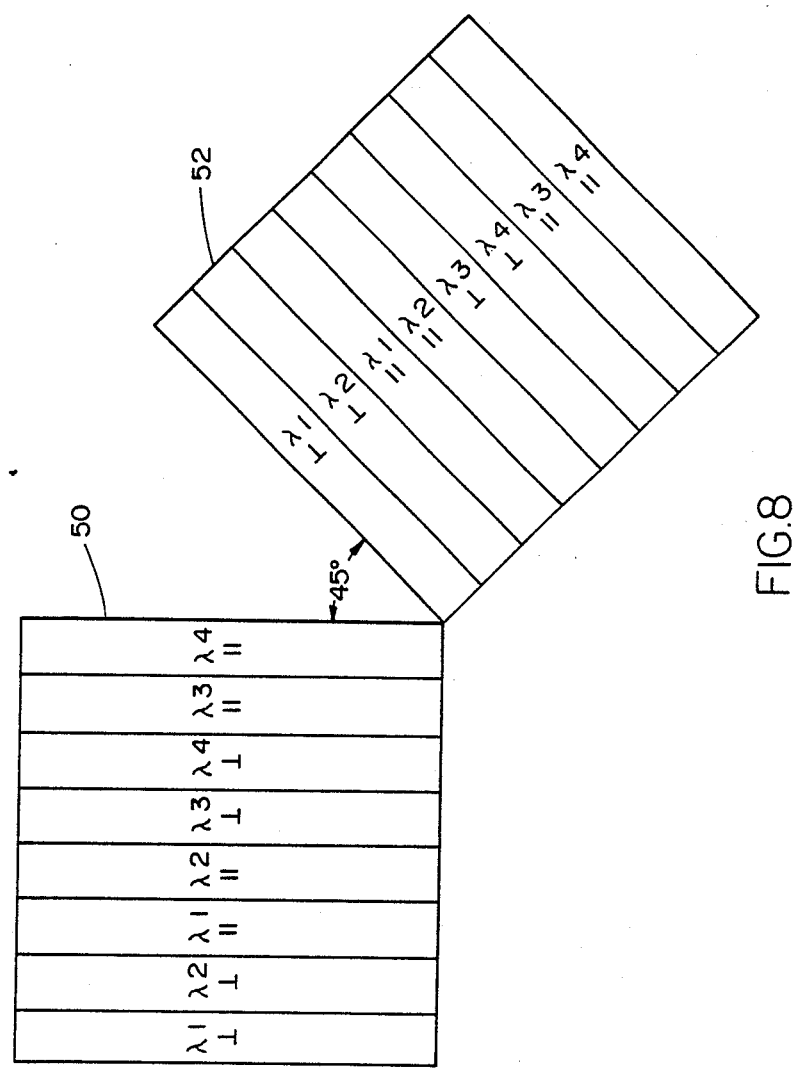
FIG. 8 illustrates a system for detecting polarized radiation incident with a skewed polarization plane, wherein the detection system is formed by first and second detectors as disclosed herein, positioned with the lines of polarization of the first filter positioned at a 45° angle relative to the lines of polarization of the second filter.

The embodiment of FIG. 8 essentially takes four measurements of the radiation of each wavelength λn, two by the radiation filter/detector 50, one parallel || and one perpendicular ⊥, and two by the radiation filter/detector 52, one parallel || and one perpendicular ⊥, with the interference lines (both parallel || and perpendicular ⊥) of the filter/detector 50 preferably extending at a 45° acute angle relative to the interference lines (both parallel || and perpendicular ⊥) of the filter/detector 52. Other acute angles other than 45° could also be utilized, but result in a more complicated analysis and transformation of the data to a form which simulates detection in the special instance mentioned hereinabove when the principal plane also contains a vertical line perpendicular or normal to the area being detected and analyzed.

The transformation of the four actual measurements with a skewed principal plane into four data values representative of measurements in the special instance of a perpendicular principal plane is a straightforward procedure as described in POLARIZATION AND INTENSITY OF LIGHT IN THE ATMOSPHERE, 1988, by Kinsell L. Coulson, and by "Proposed design of an imaging spectropolarimeter/photometer for remote sensing of earth resources", by the present inventor Walter G. Egan, OPTICAL ENGINEERING, October 1986, Vol. 25, No. 10.

The embodiment of FIG. 8 is capable of completely detecting and analyzing linearly polarized radiation, but is not capable of detecting and completely analyzing radiation which is circularly polarized or elliptically polarized or radiation which has both a circular polarization component and a linear polarization component. In the latter instance a wave plate or retardation plate is also required (possibly two wave plates, one at 0° orientation and the second at 45° orientation).

A wave plate serves to retard one radiation component relative to the component perpendicular thereto. A retardation plate or wave plate, when appropriately chosen, can efficiently convert any form of polarization into any other form. More specifically, a primary function of wave plate retarders is to produce and analyze nonusual circular and elliptical polarization. Physically, a retarder can be a thin crystalline plate, such as calcite or on anisotropic plastic, with its optic axis parallel to the plane of the plate. Depending upon whether the incident ray is polarized parallel to the x or y axis, the index of refraction that it sees differs. The index of refraction along the y axis(o ray) is larger than that along the x axis(e ray), resulting in a wave that travels faster when polarized along the x axis. Thus, when a wave is plane polarized at an angle of 45° (half way between the x and y axis), it is split into two components along the respective axes. If the relative delay of the fast and slow waves is an integral multiple of a wavelength, there is no effect on the ray emerging from the retarder except for some slight loss on external reflection from the left side of the plate, internal reflection on the right side of the plate, and absorption within the plate(and possibly scattering from molecules within the plate). However, if the delay is some fraction of the wavelength, various results are possible. Thus, if the delay is 90° (i.e. λ/4), circularly polarized radiation can be produced. Conversely, circular polarization can be converted to linear polarization using a λ/4 (quarter wave) plate. If the incident plane polarized radiation is at an angle other than 45°, elliptical polarization would be produced, the ellipticity depending upon the angle.

Most quarter wave plates have chromatism; that is, the phase shift depends on the wavelength of the radiation: a quarter wave plate selected for one wavelength would produce a different phase shift at another wavelength. Because of the need for a fixed phase shift (λ/4, for instance) in order to analyze polarized radiation, adjustable phase shifters are available from Continental Optics, Hauppauge, NY, transmitting the range from the ultraviolet to the long wavelength infrared. Moreover, the Polaroid Corporation makes a variety of circular polarizers, restricted to producing a quarter wave phase shift at one wavelength.

The embodiment of FIG. 9 is designed to detect and analyze radiation having a circular polarization component in the special case of detection operating in the principal plane, and basically adds to the previous embodiments one additional measurement for each measurement (both parallel || and perpendicular ⊥) at each wavelength λn, adding a quarter wave plate layer for each wavelength λn. Each λ/4 wave plate layer must be designed individually for each wavelength λn, in recognition of the discussion hereinabove on the wavelength depence of λ/4 wave plate.

Figure 10:
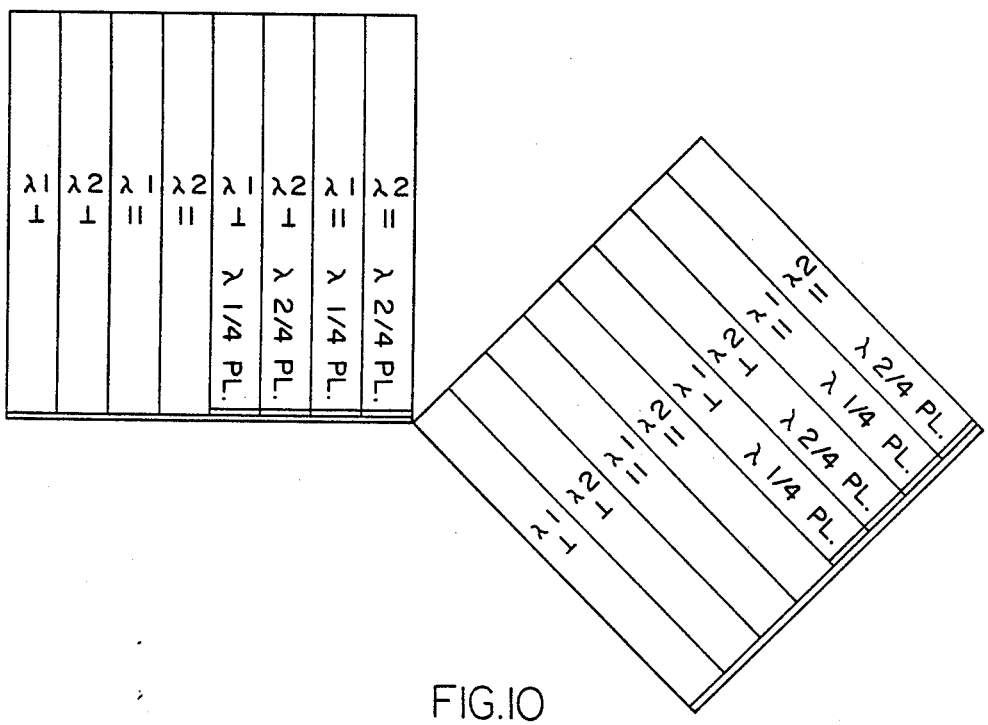
FIG. 10 illustrates a system pursuant to the present invention for detecting polarized radiation having a circular polarization component with a skewed polarization plane, wherein the detection system is formed by first and second detectors as disclosed herein in FIG. 9, positioned with the lines of polarization of the first filter positioned at a 45° angle relative to the lines of polarization of the second filter.

For measurements made in a skewed radiation plane, a system analagous to the system of FIG. 8 is required. Referring to FIG. 10, the system includes two filter/detector structures as disclosed in FIG. 9, with a 45° angle being defined therebetween.

While several embodiments and variations of the present invention for a detection system for polarized radiation having a circular polarization component while utilizing filter structures having combined wavelength and polarization sensitive characteristics are described in detail herein, it should be apparent that the disclosure and teachings of the present invention will suggest many alternative designs to those skilled in the art.

What is claimed is:

1. A system for detecting polarized radiation having a circular polarization component, comprising a radiation filter which comprises a plurality of different wavelength λ1 to λn interference filter coatings applied to different areas of filter substrate, including at least four coating areas for each wavelength λn, such that different wavelengths λ1 to λn are passed by the different areas of the substrate, and a plurality of different polarization filters of either parallel polarization or perpendicular polarization applied to said different areas of the filter substrate, such that some of the different areas of the filter substrate pass radiation of parallel polarization and others of the different areas pass radiation of perpendicular polarization, and at least first and second quarter wave plates for each different wavelength $\lambda n$, a first quarter wave plate being applied over a parallel polarization $\lambda n$ coating area, and a second quarter wave plate being applied over a perpendicular polarization $\lambda n$ coating area, and each quarter wave plate being designed particularly for each wavelength $\lambda n$ and applied to both the parallel and perpendicular polarization filters to enable a characterization of the circular polarization component of the radiation.

2. A system for detecting polarized radiation incident with a skewed polarization plane, as claimed in claim 1, comprising first and second radiation filters, each of which comprises a filter structure as recited in claim 1, and said first radiation filter is oriented with its parallel and perpendicular axes of polarization positioned at acute angles relative to respectively parallel and perpendicular axes of polarization of the second filter, such that radiation incident on the first and second radiation filters with a skewed polarization plane can be detected and analyzed with respect to its state of polarization.

3. A system for detecting polarized radiation incident with a skewed polarization plane, as claimed in claim 1, wherein said plurality of different wavelength coatings are applied as a plurality of parallel adjacent coating stripes, including first, second, third and fourth stripes for each wavelength $\lambda 1$ to $\lambda n$, and including at least two parallel polarization filters for each first stripe for each wavelength $\lambda 1$ to $\lambda n$ and at least two perpendicular polarization filters for each wavelength $\lambda 1$ to $\lambda n$, such that parallel and perpendicular polarization components are passed for each wavelength $\lambda 1$ to $\lambda n$.

4. A system for detecting polarized radiation incident with a skewed polarization plane, as claimed in claim 3, wherein said plurality of parallel adjacent interference filter stripes are applied on a first side of the substrate, and said plurality of different polarization filters are applied as a plurality of parallel adjacent stripes to the opposite second side of the substrate.

5. A system for detecting polarized radiation incident with a skewed polarization plane, as claimed in claim 3, wherein said plurality of parallel adjacent interference filter stripes and said plurality of different polarization filters are both applied on the same side of the substrate.

6. A system for detecting polarized radiation incident with a skewed polarization plane, as claimed in claim 1, wherein said substrate comprises a radiation detector array.

* * * * *